US 7,610,267 B2

(12) United States Patent
Kulkarni et al.

(10) Patent No.: US 7,610,267 B2
(45) Date of Patent: Oct. 27, 2009

(54) UNSUPERVISED, AUTOMATED WEB HOST DYNAMICITY DETECTION, DEAD LINK DETECTION AND PREREQUISITE PAGE DISCOVERY FOR SEARCH INDEXED WEB PAGES

(75) Inventors: Parashuram Kulkarni, Bangalore (IN); Thejas Madhavan Nair, Bangalore (IN); Binu Raj, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 216 days.

(21) Appl. No.: 11/203,832

(22) Filed: Aug. 13, 2005

(65) Prior Publication Data

US 2006/0294052 A1    Dec. 28, 2006

(30) Foreign Application Priority Data

Jun. 28, 2005    (IN) .......................... 560/KOL/2005

(51) Int. Cl.
*G06F 17/30*    (2006.01)
(52) U.S. Cl. ............................... 707/2; 707/3; 707/100; 715/205; 725/37
(58) Field of Classification Search ...................... 707/2, 707/3, 100; 715/205; 725/37
See application file for complete search history.

(56) References Cited

U.S. PATENT DOCUMENTS

| 6,064,952 | A | 5/2000 | Imanaka et al. | |
| 6,219,818 | B1 * | 4/2001 | Freivald et al. | 714/799 |
| 6,738,344 | B1 * | 5/2004 | Bunton et al. | 370/216 |
| 6,871,213 | B1 | 3/2005 | Graham et al. | |
| 7,155,489 | B1 * | 12/2006 | Heilbron et al. | 709/217 |
| 7,464,326 | B2 * | 12/2008 | Kawai et al. | 715/205 |
| 2002/0156779 | A1 * | 10/2002 | Elliott et al. | 707/6 |
| 2004/0070606 | A1 * | 4/2004 | Yang et al. | 345/745 |
| 2004/0083424 | A1 * | 4/2004 | Kawai et al. | 715/501.1 |
| 2005/0114319 | A1 * | 5/2005 | Brent et al. | 707/3 |
| 2005/0120060 | A1 * | 6/2005 | Meng | 707/202 |
| 2005/0192936 | A1 * | 9/2005 | Meek et al. | 707/3 |

(Continued)

FOREIGN PATENT DOCUMENTS

WO    WO 0152078    *    7/2001

OTHER PUBLICATIONS

J.L. Wolf et al, "Optimal crawling strategies for web search engines", In proceedings of the 11th International World Wide Web Conference, pp. 136-147, 2002.*

(Continued)

*Primary Examiner*—Etienne P LeRoux
*Assistant Examiner*—Hung D Le
(74) *Attorney, Agent, or Firm*—Hickman Palermo Truong & Becker LLP

(57) ABSTRACT

Automated crawling of page links associated with a site domain that was previously crawled involves computing the dynamicity of a site based on totals of continuous dead links, live links and/or prerequisite pages encountered while crawling page links corresponding to the site. The degree to which links are crawled is optimized based on the dynamicity of the site. Some pages require that another particular page (i.e., a prerequisite page) is retrieved from the host prior to retrieving a given page, e.g., so that the prerequisite page can set a cookie. Prerequisite pages are determined based on stored information about pages that were retrieved, during a previous crawl, prior to retrieving a page. Prerequisite pages are identified to a search system so that when a user clicks on the URL for the page, the request is redirected to the prerequisite page to set the cookie appropriately.

26 Claims, 5 Drawing Sheets

U.S. PATENT DOCUMENTS

| | | | |
|---|---|---|---|
| 2005/0262063 A1* | 11/2005 | Conboy et al. ................. | 707/3 |
| 2005/0289446 A1* | 12/2005 | Moncsko et al. ......... | 715/501.1 |
| 2006/0112089 A1* | 5/2006 | Broder et al. ................. | 707/4 |
| 2006/0294052 A1 | 12/2006 | Kulkarni et al. | |
| 2008/0097958 A1 | 4/2008 | Ntoulas et al. | |

OTHER PUBLICATIONS

Dennis Fetterly et al, "A Large-Scale Study of the Evolution of Web Pages", ACM, Budapest, Hungary, 2003, p. 669-678.*

Brian E. Brewington et al, "How dynamic is the web?", Thayer School of Engineering, Dartmouth College, 2000, p. 1-20.*

Ziv Bar-Yossef et al, "Sic Transit Gloria Telae: Towards an Understanding of the Web's Decay", ACM, 2004, p. 328-338.*

Fred Douglis et al, "Rate of Change and other Metrics: a Live Study of the World Wide Web", AT & T Labs Research, 1997.*

Hedley, Y.L.; Younas, M.; James, A.; Sanderson, M.; Query-related data extraction of hidden web documents; Jul. 25-29, 2004; http://doi.acm.org/10.1145/1008992.1009119, p. 558-559.

* cited by examiner

UNSUPERVISED, AUTOMATED WEB HOST DYNAMICITY DETECTION, DEAD LINK DETECTION AND PREREQUISITE PAGE DISCOVERY FOR SEARCH INDEXED WEB PAGES

CROSS-REFERENCE TO RELATED APPLICATIONS

This application is related to and claims the benefit of priority from Indian Patent Application No. 560/KOL/2005 filed in India on Jun. 28, 2005, entitled "Unsupervised, Automated Web Host Dynamicity Detection, Dead Link Detection and Prerequisite Page Discovery for Search Indexed Web Pages"; the entire content of which is incorporated by this reference for all purposes as if fully disclosed herein.

FIELD OF THE INVENTION

The present invention relates to computer networks and, more particularly, to techniques for automated Web host dynamicity detection, dead link detection, and prerequisite URL discovery for Web content.

BACKGROUND OF THE INVENTION

World Wide Web-General

The Internet is a worldwide system of computer networks and is a public, self-sustaining facility that is accessible to tens of millions of people worldwide. The most widely used part of the Internet is the World Wide Web, often abbreviated "WWW" or simply referred to as just "the Web". The web is an Internet service that organizes information through the use of hypermedia. The HyperText Markup Language ("HTML") is typically used to specify the contents and format of a hypermedia document (e.g., a web page).

In this context, an HTML file is a file that contains the source code for a particular web page. A web page is the image or collection of images that is displayed to a user when a particular HTML file is rendered by a browser application program. Unless specifically stated, an electronic or web document may refer to either the source code for a particular web page or the web page itself. Each page can contain embedded references to images, audio, video or other web documents. The most common type of reference used to identify and locate resources on the Internet is the Uniform Resource Locator, or URL. In the context of the web, a user, using a web browser, browses for information by following references that are embedded in each of the documents. The HyperText Transfer Protocol ("HTTP") is the protocol used to access a web document and the references that are based on HTTP are referred to as hyperlinks (formerly, "hypertext links").

Search Engines

Through the use of the web, individuals have access to millions of pages of information. However a significant drawback with using the web is that because there is so little organization to the web, at times it can be extremely difficult for users to locate the particular pages that contain the information that is of interest to them. To address this problem, a mechanism known as a "search engine" has been developed to index a large number of web pages and to provide an interface that can be used to search the indexed information by entering certain words or phrases to be queried. These search terms are often referred to as "keywords".

Indexes used by search engines are conceptually similar to the normal indexes that are typically found at the end of a book, in that both kinds of indexes comprise an ordered list of information accompanied with the location of the information. An "index word set" of a document is the set of words that are mapped to the document, in an index.

For example, an index word set of a web page is the set of words that are mapped to the web page, in an index. For documents that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate web documents around the world. Upon locating a document, the crawler stores the document and the document's URL, and follows any hyperlinks associated with the document to locate other web documents. Feature extraction engines then process the crawled and locally stored documents to extract structured information from the documents. In response to a search query, some structured information that satisfies the query (or documents that contain the information that satisfies the query) is usually displayed to the user along with a link pointing to the source of that information. For example, search results typically display a small portion of the page content and have a link pointing to the original page containing that information.

Second, each search engine contains an indexing mechanism that indexes certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., a URL), that contain information that is of interest to them.

The search engine interface allows users to specify their search criteria (e.g., keywords) and, after performing a search, an interface for displaying the search results. Typically, the search engine orders the search results prior to presenting the search results interface to the user. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search results page" that presents information about the matching documents in the selected display order.

Dead Links

Dead links are a big problem on the web. Many Information Integration Systems (IIS) on the Web, such as search engines, job portals, shopping search sites, travel search sites, applications that include syndication feeds (e.g., Really Simple Syndication (RSS) based applications), and many more, usually gather and display information collected all over the Web and attempt to serve as a primary resource for all information needs for users. The information initially rendered to the user is concise and relevant and almost always has a link or URL pointing to the actual source of the information that, at one time, contained the requested information in its entirety.

Because the time taken by the entire crawling and indexing process is considerably large and due to the ever changing nature of Web pages, there is always a high probability that (1) a link or URL is now "dead" (the page is gone), (2) the user is redirected to another page which does not have the expected information, or (3) the content itself has been modified by the Web master and, consequently, no longer contains the expected information. It detracts from a Web user's experience to click on a link looking for some information, only to find that the page has disappeared or that the page does not have the information claimed by the search results. Hence, it is significantly beneficial for Information Integration Systems to detect and prevent such dead links from being shown to the user and, therefore, preventing a bad user experience.

Dead links on the Web can occur due to different reasons and, therefore, can be classified into different types, as follows. (1) The web page is no longer locatable using the link. This may happen if the page or Web site has been moved or removed (i.e., is dead). (2) The Web page is still alive, but the content has changed and no longer has the information that is expected to be found there. (3) The URL of the Web page requires HTTP "POST" data to be supplied in order to view the page contents, because the expected content may be dynamically generated by a script based on the POST data supplied. (4) Visiting that Web page requires a cookie to be set from another page and, therefore, the page that sets the cookie needs to be visited before the desired page. Some existing systems attempt to resolve one or more of the problems that result in what manifest to the user as dead links. However, such systems have their shortcomings, some of which are as follows.

Type 1 dead links are detectable by simply reviewing the header timestamp of a response to an HTTP request, or a connection failure. Detecting dead links in this manner is most commonly used in almost all, if not all, existing systems.

One approach to managing dead links in an information integration system is to refresh the crawl quite frequently. For a crawl that is directed to a relatively small subset of the Web, the crawl may be refreshed every couple days or so. However, for a crawl directed to a relatively large subset of the Web, or the entire Web, the crawl refresh rate is more on the order of every 30 days or so. Given the high volume of pages from the Web, and the dynamic nature of the Web, it is impractical, if not impossible, to use the refresh crawl approach effectively when the goal is to index as much of the entire Web as possible.

One approach to managing dead links in an information integration system employs a program that checks the validity of all the links by visiting each of the indexed pages that were previously crawled. Even though this approach might prevent dead links from appearing in such systems, this approach results in a significant number of live pages appearing as dead links to these programs. For example, type 4 dead links appear valid because during the crawl, and even during a refresh, the cookies to reach these links are set in the previous pages. However, these links appear as dead links when the users try to visit the page directly from the link (e.g., a link presented in a search result), in which case the cookie is not set.

Systematically checking the validity of all the indexed pages requires bombarding Web sites with multiple requests (i.e., one per URL), which may result in DOS (denial of service) attacks, and which may consequently prompt the Web masters to block the programs from accessing their web sites. Such a strategy also results in the dead link detection process itself taking too long (e.g., perhaps as long as the actual crawl) if the volume of pages requested is significantly large, thereby rendering the process relatively ineffective.

One approach to managing dead links in an information integration system is to only fetch and check the header of a page, and to review a timestamp that is supposed to indicate the last time the page content was changed. However, many Web masters do not update this timestamp, thereby this process is also relatively ineffective.

One approach to managing dead links in an information integration system is to use an extraction tool-based dead link detection tool through which prerequisite URLs are manually detected and provided to the system on a per site basis. This approach is manual and can be labor-intensive and error prone.

Based on the foregoing, there is a need for improved techniques for detecting actual dead links, and detecting them in an efficient and site-friendly manner.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Techniques are described herein for automated discovery of Web host dynamicity and dead links, and automated prerequisite URL discovery. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview of Embodiments

Generally, embodiments of the invention involve crawling, in an automated manner, page links associated with a site domain. For example, such embodiments may be used in conjunction with crawling, by a Web crawler, the World Wide Web.

According to one aspect of the invention, a dead link is identified based on the corresponding page content. That is, a dead link is identified by calculating the amount of difference between a current version of a page and a version of the page that was previously crawled, based on stored crawler information about the content of a page when it was previously crawled. Based on the amount of difference, a page and its corresponding link are marked as either dead or alive. Hence, dead links can be removed from a database of searchable pages so that users do not have to encounter the dead links when searching and surfing, for example, the World Wide Web.

Some pages require that another particular page (i.e., a prerequisite page) is retrieved from the host prior to retrieving a given page from the host, e.g., so that the prerequisite page can set a cookie. According to one aspect of the invention, which particular one or more pages are required to be retrieved in order to retrieve the page is determined based on stored information about pages that were retrieved from the host, during a previous crawl, prior to retrieving the page. Identifiers for prerequisite pages are fed into a search system so that when a user clicks on the URL for the page, the request is redirected to the prerequisite page, thereby avoiding the undesired and incorrect appearance that the page is dead.

According to one aspect of the invention, the degree to which the content of a domain is dynamic is computed based on running totals of dead links, live links and prerequisite pages encountered while checking page links in pages in the domain. Hence, the degree to which the content of a particular site domain is checked can be optimized based on how dynamic the content of the domain is. Consequently, a relatively dynamic domain may be exhaustively checked while a relatively static domain may be checked less exhaustively or not at all, thereby avoiding the appearance of DoS attacks and avoiding unnecessary use of crawl-related system resources.

System Architecture

Figure 1:
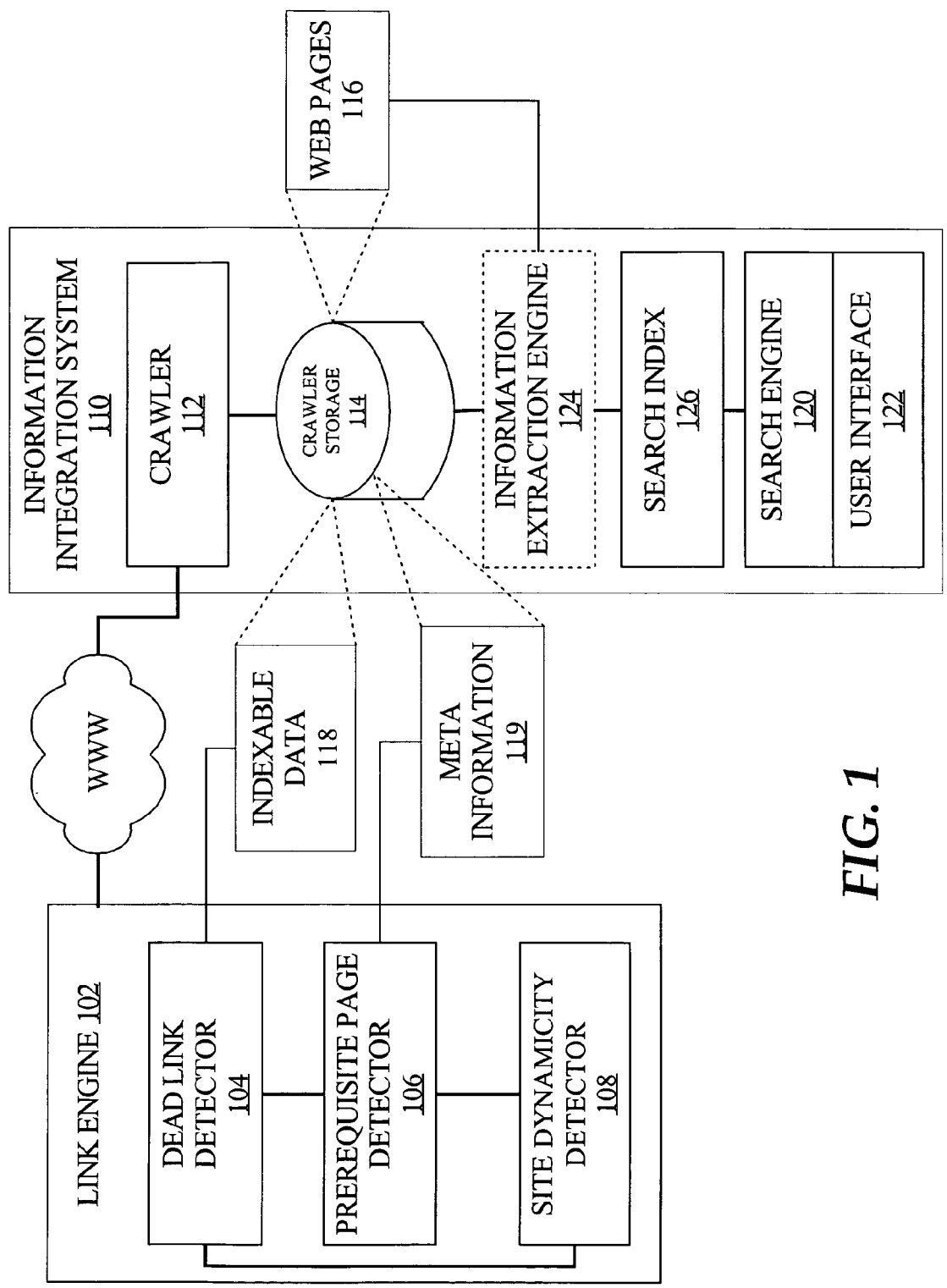
FIG. 1 is a block diagram that illustrates a link checking system and an information integration system, according to which an embodiment of the invention may be implemented.

FIG. 1 is a block diagram that illustrates a link checking system and an information integration system, according to which an embodiment of the invention may be implemented. System 100 illustrates a link engine 102 communicatively coupled to an information integration system (IIS) 110. Link engine 102 can be implemented to operate with (e.g., as a plug-in software module) any type of IIS 110, for non-limiting examples, search engines, job portals, shopping search sites, travel search sites, RSS (Really Simple Syndication) based applications and sites, etc. Further, link engine 102 can be implemented to operate with a computer operating system or other file system in which links are used to move among resources. Embodiments of the invention are described herein primarily in the context of a World Wide Web (WWW) search system, for purposes of an example. However, the context in which embodiments are implemented may vary and, therefore, are not limited to Web search systems.

Link engine 102 comprises a dead link detector 104, a prerequisite page detector 106, and a site dynamicity detector 108, each of which are described in greater detail herein. In one embodiment, link engine 102 is a multi-threaded system in which each thread operates on individual hosts (Web sites). That is, only a single thread operates on a single host, i.e., there is a one-to-one relationship between processing threads and hosts. Thus, serialized crawling is performed on a particular host, but not across hosts. In one embodiment, the frequency of each cycle of link checking, as well as the time interval between page retrievals, is configurable. After a link checking cycle, the link engine 102 marks a subset of the indexed URLs as invalid, i.e., dead.

IIS 110 can be implemented as a conventional system, comprising a crawler 112 communicatively coupled to a source of information, such as the Internet and the World Wide Web (WWW). IIS 110 further comprises crawler storage 114, a search engine 120 backed by a search index 126 and associated with a user interface 122.

A web crawler (also referred to as "crawler", "spider", "robot"), such as crawler 112, "crawls" across the Internet in a methodical and automated manner to locate web documents around the world. Upon locating a document, the crawler stores the document's URL, and follows any hyperlinks associated with the document to locate other web documents. The crawler may also store entire Web pages, indexable data (e.g., page content words before processing of page by information extraction engine 124), and metadata associated with each. This information, such as Web pages 116 and indexable data 118, is stored in crawler storage 114. For non-limiting examples, the stored information may include data used in an HTTP POST method during a crawl, and the order in which pages were visited during a crawl. Use of this information, according to embodiments of the invention, is described in greater detail herein.

Search engine 120 is a mechanism used to index and search a large number of Web pages, and is used in conjunction with a user interface 122 that can be used to search the search index 126 by entering certain words or phases to be queried. In general, the index information stored in search index 126 is generated based on the contents of the HTML file associated with the document and the general focus of the IIS 110, and may be generated with the assistance of an information extraction engine 124. For example, if the crawler is storing all the pages that have job descriptions, an extraction engine may extract useful information from these pages, such as the job title, location of job, experience required, etc. and use this information to index the page in the search index 126. One or more search indexes 126 associated with search engine 120 comprise a list of information accompanied with the location of the information, i.e., the network address of, and/or a link to, the page that contains the information. An index word set of a Web page is the set of words that are mapped to the web page, in an index.

Dead Link Detector

Dead link detector 104 checks for dead links based on the content of pages, by determining whether or not a page under consideration is a dead page (i.e., the page is referenced by a "dead link") based on the current content of the page in relation to the previously-crawled content of the page. The same general idea is meant when referring herein to a "dead page" or to a "dead link". That is, references to a dead page and to a dead link both mean that (a) the expected page content, based on a previous crawl, is no longer available by using the link (e.g., a hypertext link, or URL), or that (b) the page content has changed since the previous crawl to a degree that the index word set for the page is no longer considered to accurately reflect the current content of the page. As mentioned, some links may at times appear as referencing dead pages in search results because the appropriate prerequisite page was not first retrieved in order to set a cookie to retrieve the desired page, or because the appropriate required post data was not transmitted to the host server to retrieve the page. However, dead link detector 104 and prerequisite page detector 106 access and use information compiled and stored in response to a previous crawl, to avoid the appearance to a user that a link references a dead page when, in fact, the page is alive.

A Process for Detecting Dead Links

Figure 2:
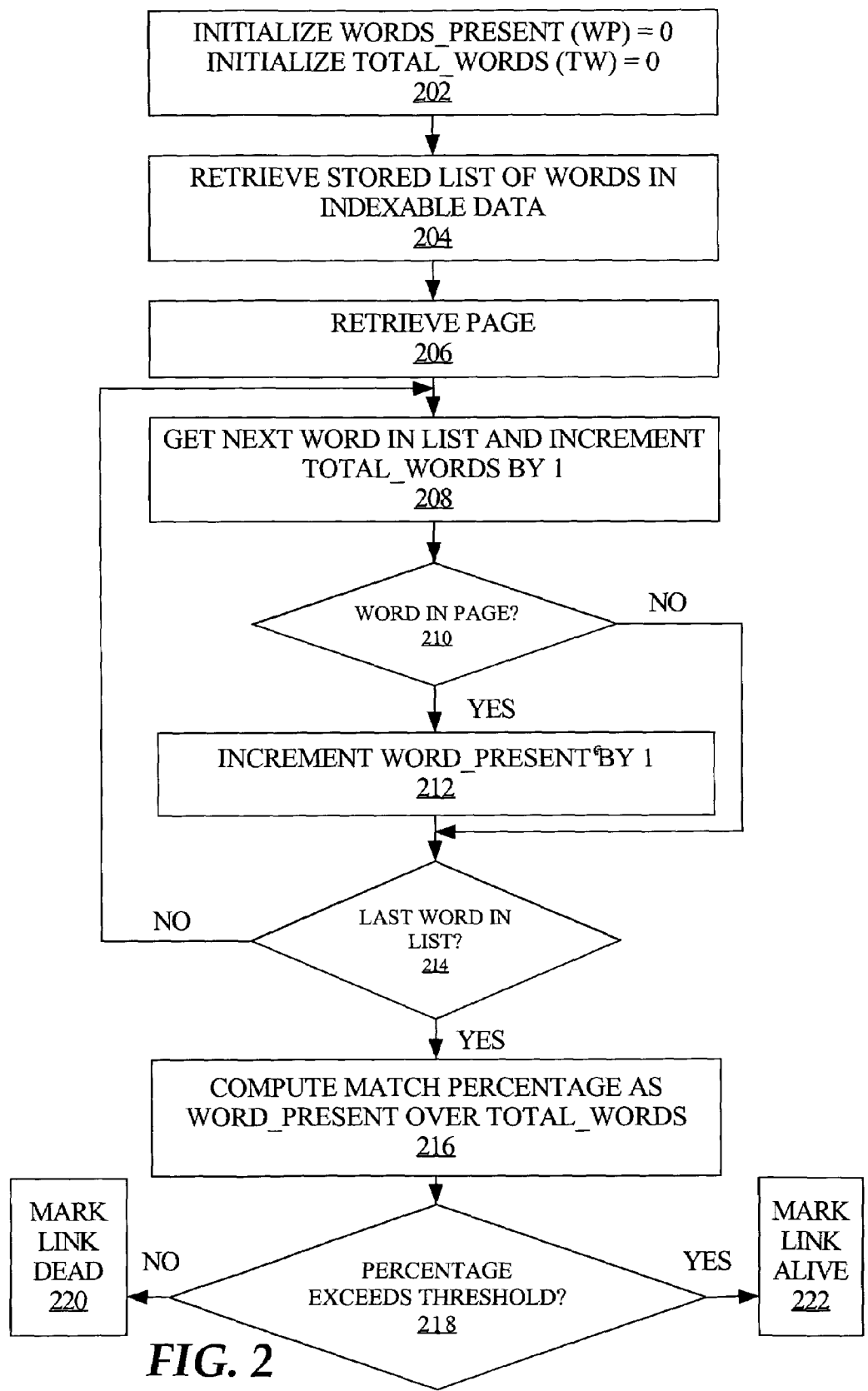
FIG. 2 is a flow diagram that illustrates an automated process for detecting dead links, according to an embodiment of the invention.

FIG. 2 is a flow diagram that illustrates an automated process for detecting dead links, according to an embodiment of the invention. In one embodiment, the process illustrated in FIG. 2 is implemented for automated performance by a conventional computing system, such as computer system 500 of FIG. 5. Further, in one embodiment, the process illustrated in FIG. 2 is implemented for automated performance within a software system architecture, such as that illustrated in FIG. 1.

At block 202, the process is initialized by initializing a variable, which tracks the number of words from indexable data 118 (FIG. 1) that are present in the current version of the page under consideration, to zero. For example, a variable word_present (WP) is set to zero. Further at block 202, initialize a variable, which tracks the total number of words considered from indexable data 118 during the process of FIG. 2, to zero. For example, a variable total_words (TW) is set to zero.

At block 204, a stored list of words from indexable data is retrieved. For example, indexable data 118 (FIG. 1) is retrieved from crawler storage 114 (FIG. 1), where the indexable data 118 comprises a listing of all the words found in a previous crawl of the page currently under consideration.

At block 206, the page currently under consideration is retrieved from the host. In one embodiment, dead link detector 104 (FIG. 1) examines stored meta information associated with the URL corresponding to the page, to determine whether retrieving the page requires an HTTP POST method and associated post data. For example, dead link detector 104 retrieves, from crawler storage 114 (FIG. 1), crawler-based metadata associated with Web pages 116 (FIG. 1). If the metadata indicates that the previous crawl of the page required post data, then a HTTP POST request is used in conjunction with corresponding stored post data to retrieve the page from the host. Otherwise, an HTTP GET method is used.

At block 208, the next word from the list of indexable data 118 (FIG. 1) is fetched and compared to the current page content. Further, the running total of the total number of words that have so far been considered from the indexable data 118 (e.g., TW variable), for the page under consideration, is incremented by one.

Hence, at decision block 210, it is determined whether or not there is a match for the word currently under consideration. In other words, it is determined whether the word, which was present in the page during the previous crawl, is still present in the page. If there is a match at block 210, then at block 212, the variable that represents the running total number of matching words (e.g., WP variable) so far identified, for the page under consideration, is incremented by one. Thus, blocks 208 and 212 track the running totals of words considered and words matched. If there is not a match at block 210, the control moves to decision block 214.

At decision block 214, if the word currently under consideration is not the last word in the list, then control returns to block 208 to fetch the next word in the list and to increment by one the running total of words considered (e.g., TW variable). If the word currently under consideration is the last word in the list, then control moves to decision block 216.

At block 216, the difference between the current page content and the page content at the time of the previous crawl is determined. This difference is determined by computing the percentage of words considered that have matched, e.g., word_present divided by total_words equals the match percentage. This computed match percentage is then compared to a predetermined threshold value to determine whether the difference between the current page content and the previously-crawled page content exceeds the threshold, at decision block 218.

If the match percentage is above (or perhaps equal to) a threshold value (for a non-limiting example, 90%), then the link is considered alive and is marked as alive, at block 222. Otherwise, if the difference percentage is not above the threshold value, then the link is considered dead and is marked as dead, at block 220. Even if the page is alive, the corresponding page content might have changed to some degree since the previous crawl. Thus, a threshold value less than 100% is used to allow for slight changes on the page, such as a change of advertisements, dates, etc., which do not reflect the real validity of the page link under consideration.

Prerequisite Page Detector

Generally, prerequisite page detector 106 uses meta information stored in the crawler storage 114, for a particular page, to determine if retrieval of the particular page requires prior retrieval of another page to set a "cookie" (generally, "request information") that is required for retrieval of the particular page from the host. A cookie is information transmitted by a Web server to a client Web browser. The information is then sent back to the server each time the browser requests a page from the server. This page that sets the cookie that is required for retrieval of the particular page is referred to herein as the "prerequisite page" (or "prerequisite URL") for that particular page. This meta information that is stored in response to a previous crawl of the page, and that is used by prerequisite page detector 106, comprises (a) all the ancestor URL's of the current URL and (b) the order in which these ancestor URL's were visited during the previous crawl.

The meta information used to identify a prerequisite page for a particular page does not need to include the URL of every page that was retrieved from the host prior to retrieving the particular page, during the previous crawl. Rather, the meta information used to identify a prerequisite page for a particular page comprises only the one or more URL's of ancestor pages of the particular page, where an ancestor page is determinable from the hierarchical structure of the site domain to which the pages belong. It is conventional for a crawler to store this ancestor meta information when crawling a site.

A Process for Detecting Prerequisite Pages

Figure 3:
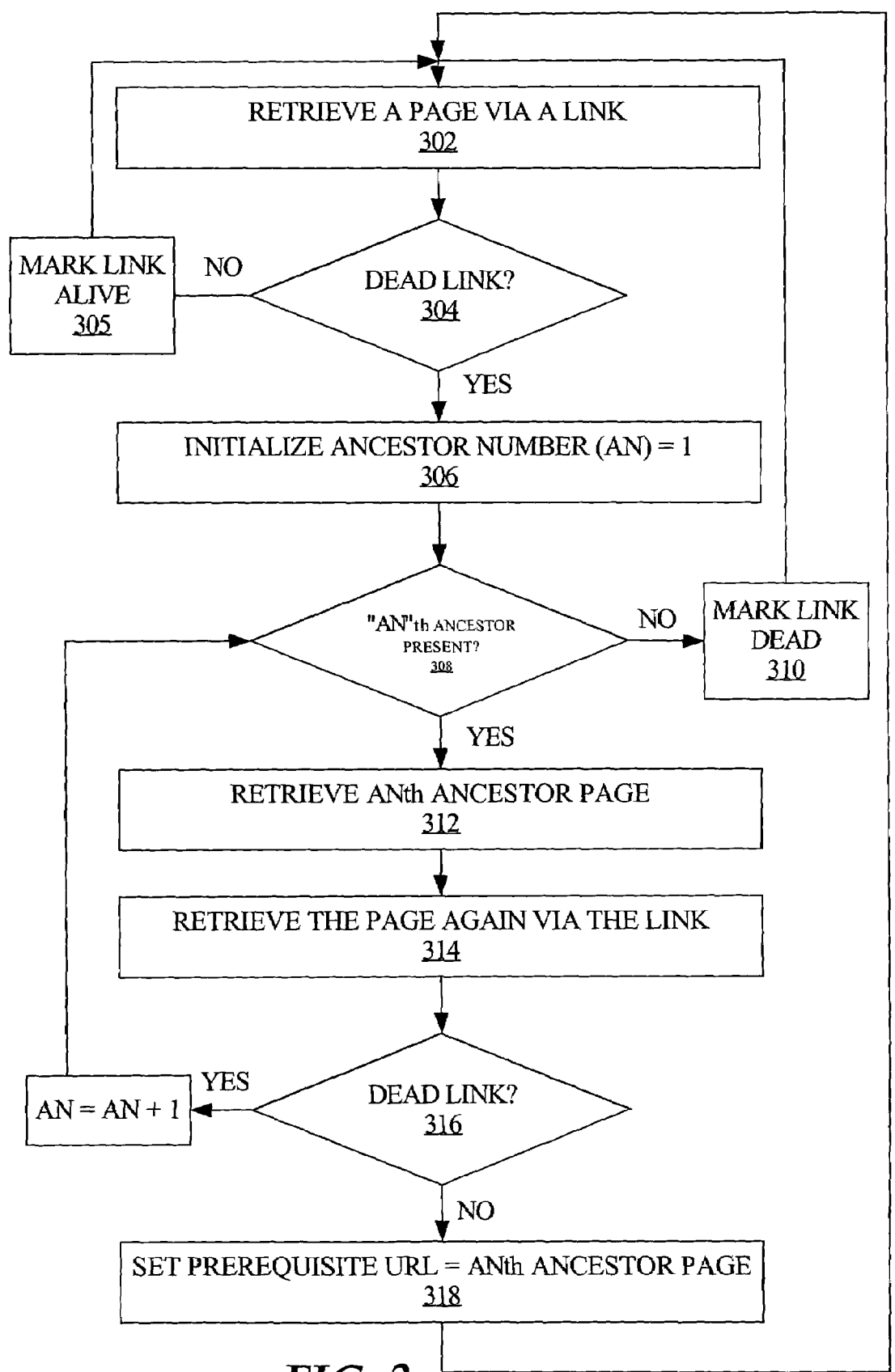
FIG. 3 is a flow diagram that illustrates an automated process for detecting prerequisite pages, according to an embodiment of the invention.

FIG. 3 is a flow diagram that illustrates an automated process for detecting prerequisite pages, according to an embodiment of the invention. In one embodiment, the process illustrated in FIG. 3 is implemented for automated performance by a conventional computing system, such as computer system 500 of FIG. 5. Further, in one embodiment, the process illustrated in FIG. 3 is implemented for automated performance within a software system architecture, such as that illustrated in FIG. 1.

At block 302, a page is retrieved from the host via a link. At decision block 304, it is determined whether the page is represented (i.e., in the IIS 110 of FIG. 1) by a dead link. In one embodiment, at block 304 the processing thread that is executing prerequisite page detector 106 (FIG. 1) makes a call to, or invokes, dead link detector 104 (FIG. 1) to determine whether the page is dead or alive. Therefore, in one embodiment, block 304 is performed according to the process illustrated in, and described in reference to, FIG. 2. If the page is not a dead link, then the link that represents the page in the IIS is marked as alive, at block 305, and control passes back to block 302, at which another page is retrieved from the host. This is because, if the page is retrievable from the host directly via the link and the page is determined to be alive, then the page does not require a prerequisite page in order to retrieve the page from the host. Otherwise, if the page was not retrievable directly via the link, then the page would be determined dead because there would be no page content to match with the indexable data 118 (FIG. 1), as in the process of FIG. 2. If the page was not retrievable directly via the link, that may or may not mean that the page requires retrieval of a prerequisite page to retrieve the page, because the page may no longer exist or was moved to a new URL. Thus, at block 304, it is actively determined whether the link is dead.

If it is determined that the link is dead, then at block 306 a variable is initialized, which indicates which ancestor page is currently being processed. At this stage of the process, the first ancestor page of the page under consideration is currently being processed, so the variable (referred to herein as "AN" for "ancestor number") is set to "1". The manner in which the ancestor is processed is as follows.

At block 308, it is determined whether there is an "ANth" ancestor page present in the crawler meta information that was stored in response to a previous crawl of the page.

If there is no "ANth" ancestor page indicated in the meta information, then at block 310 the link corresponding to the page under consideration is marked as dead. That is, if the crawler meta information indicates that the current page did not have any ancestor pages when previously crawled, then the current page does not require retrieval of a prerequisite page to retrieve the current page. Further, because it was determined at block 304 that the link is dead, and determined at block 308 that there is no ancestor prerequisite page, then it is concluded that the link must be an actual dead link. Therefore, the link is marked dead at block 310 and control returns to block 302 to process another page.

If, at block 308, it is determined that an "ANth" is present in the meta information, then at block 312 the "ANth" ancestor page is retrieved from the host. Then, at block 314, the current page is again retrieved from the host. Similarly to decision block 304, at decision block 316 it is determined whether the page is represented (in the IIS 110 of FIG. 1) by a dead link. In one embodiment, at block 316 the processing thread that is executing prerequisite page detector 106 (FIG. 1) invokes dead link detector 104 (FIG. 1) to determine whether the page is dead or alive. Therefore, in one embodiment, block 316 is performed according to the process illustrated in, and described in reference to, FIG. 2.

If the page still appears to have a dead link at block 316, then the variable "AN" is incremented by one and control returns to decision block 308, to determine whether a next higher ancestor page is present in the crawler meta information. The loop involving blocks 308-316 is repeatedly executed until (a) there are no more ancestor pages to process and the link is ultimately marked a dead link, at block 310; or (b) the link is determined to be alive, at block 316.

If, at block 316, the page link is determined to be alive (i.e., not determined to be a dead link), then that means that the ancestor page being processed is the prerequisite link because the ancestor page made the current page retrievable, i.e., by setting the cookie required to retrieve the current page from the host. Thus, at block 318, a prerequisite page URL is set equal to the URL for the "ANth" ancestor page, i.e., the ancestor page currently being processed. At this point, the prerequisite page has been determined and control can return to block 302 to begin processing the next page, if desired.

Furthermore, in one embodiment, the prerequisite page URL is then fed into the search system so that when a user clicks on the cited URL for the "current" page that was processed according to FIG. 3 (i.e., the page that requires a prerequisite page to set a cookie), the user interface 122 (FIG. 1) can redirect the request. That is, at search-time, a request from a user for retrieval of the page via the cited URL is (a) redirected from the cited URL to the pre requisite URL, in order to set the required cookie, and then (b) redirected to the cited URL, with the cookie set, which should result in a valid page retrieval. This process is performed without further user intervention, and avoids the appearance that the page is represented, in the IIS, with a dead link.

The process illustrated in FIG. 3 is described with reference to a cookie that must be set in order to retrieve a desired page. However, use of the techniques illustrated in FIG. 3 is equally applicable to technologies other than cookies. In other words, these techniques can be implemented for use with any browsing-based technology that embodies the concept of a server providing certain information to a client in response to retrieval of and/or interaction with a first page, where that information is required to be sent back to the server in order to retrieve a second page from the server.

Site Dynamicity Detector

As mentioned, in crawling and re-crawling (e.g., to identify dead links) Web sites, many existing systems bombard the Web sites with multiple requests (e.g., one per URL), which may appear as DoS (Denial-of-Service) attacks. A real DoS attack is a type of attack on a network resource that attempts to disrupt use of the resource by flooding the resource with useless traffic. Consequently, a real or apparent DoS attack may prompt the Web masters to block such systems from accessing their Web sites. Such an approach to identifying dead links also results in the identification process itself taking too long (e.g., possibly as long as the original crawl) and, therefore, rendering the process ineffective.

Techniques described herein eliminate the foregoing issues through an intelligent and optimized approach to link checking, which reduces the number of page requests (in some instances, by as much as 90%). Generally, the dynamicity of a web site (i.e., how often the pages in the Web site tend to change) is automatically determined, and page retrievals to determine dead links are optimized based on the dynamicity of the host's site.

A link engine 102 (FIG. 1) processing thread, during each cycle of operation on a given host, maintains running totals of information. In various embodiments, (a) the number of dead links (total and consecutive) are maintained, (b) the number of alive links (total and consecutive) are maintained, and/or (c) the number of pages for which a prerequisite page was found (total and consecutive) are maintained, or any combination of (a), (b), and (c).

This mined information is used to approximate the dynamicity of the host. This information is in turn used to optimize the link checking to regulate the number of fetches made by the system and, therefore, minimizing the risk of appearing as a DoS attack.

Figure 4:
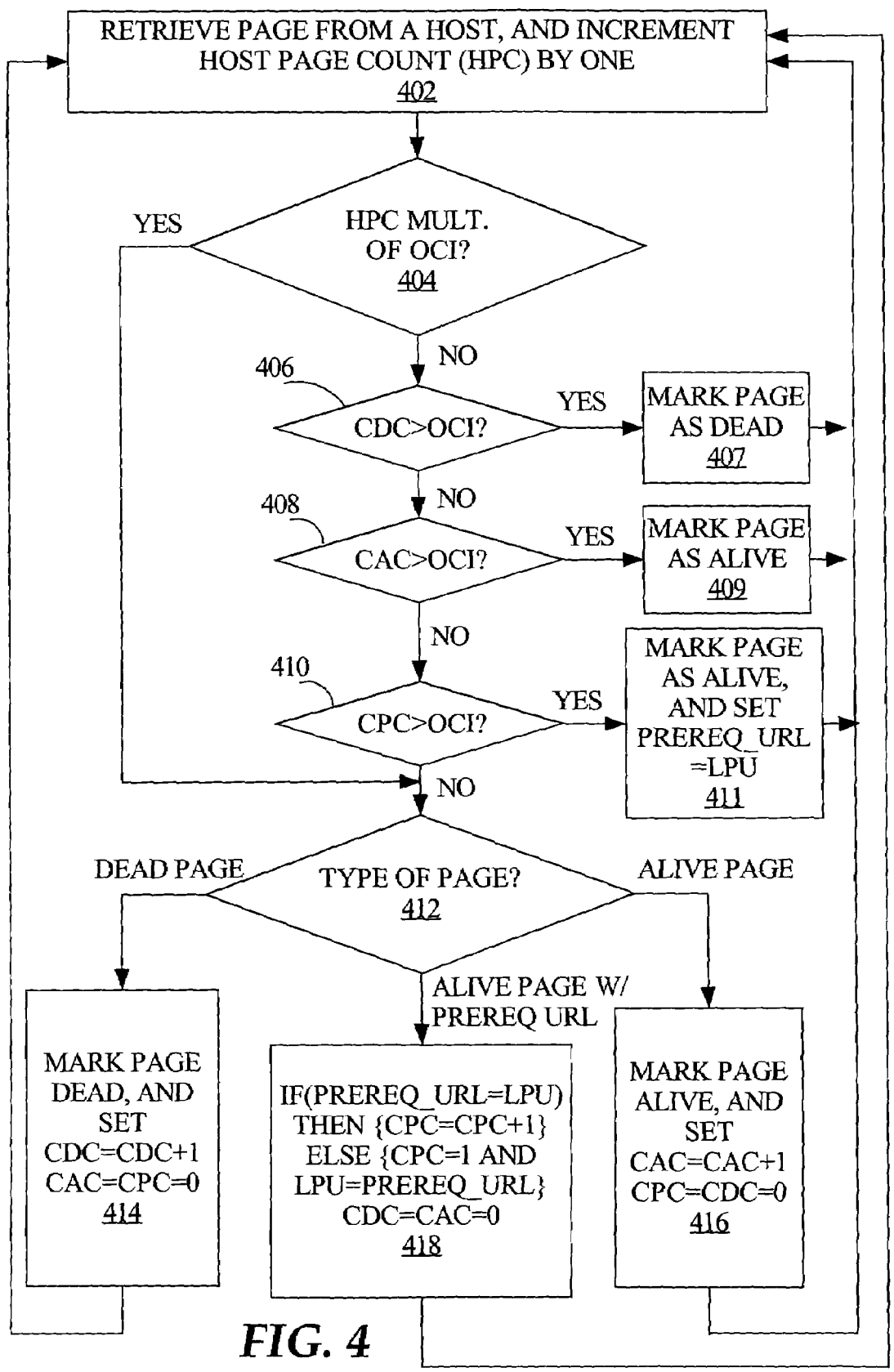
FIG. 4 is a flow diagram that illustrates an automated process for detecting the dynamicity of a site and optimizing link checking based thereon, according to an embodiment of the invention.

A Process for Detecting the Dynamicity of a Site, and Optimizing Link Checking Based Thereon FIG. 4 is a flow diagram that illustrates an automated process for detecting the dynamicity of a site and optimizing link checking based thereon, according to an embodiment of the invention. In one embodiment, the process illustrated in FIG. 4 is implemented for automated performance by a conventional computing system, such as computer system 500 of FIG. 5. Further, in one embodiment, the process illustrated in FIG. 4 is implemented for automated performance within a software system architecture, such as that illustrated in FIG. 1.

The process illustrated in FIG. 4 is initialized by initializing several variables, as follows.

HOST PAGE COUNT (HPC)=0.
    CONTINUOUS DEAD LINK COUNT (CDC)=0.
    CONTINUOUS ALIVE LINK COUNT (CAC)=0.
    CONTINOUS PREREQ. URL REQUIRED LINK COUNT (CPC)=0.
    LAST KNOWN PREREQ URL (LPU)=NONE.
    OPTIMIZATION CHECK INTERVAL (OCI)=10 (CONFIGURABLE).

At block 402, a page is retrieved from the host, and the host page count (HPC) is incremented by one. At decision block 404, it is determined whether the host page count (HPC) is a multiple of the optimization check interval (OCI). If HPC is a multiple of OCI, then the optimization portion of the process, blocks 406-411, is not performed. This is because after optimizing for a certain number of pages, as defined by the optimization check interval (OCI), the assumptions on which the optimization portion relies are validated. Essentially, the optimization portion of the process is validated every OCI pages, where OCI is a user-configurable parameter. Hence, if HPC is a multiple of OCI, then control passes to decision block 412 to determine the "type" of the current page. Thus, for the first OCI pages and for every cycle of OCI pages thereafter, statistics are maintained about the pages to infer how dynamic the site is. That is, the statistics about the pages are maintained to determine to what degree the site content changed since the previous crawl or, in other words, the tendency for the site to change since the previous crawl of the site.

At decision block 412, the type of the page currently under consideration is determined. The type of page is one of (1) a dead page; (2) an alive page; and (3) an alive page with a prerequisite page. In one embodiment, the thread processing block 412 invokes dead link detector 104 (FIG. 1) to perform the process illustrated in and described in reference to FIG. 2, to determine whether the page is dead or alive. In one embodiment, the thread processing block 412 invokes prerequisite page detector 106 (FIG. 1) to perform the process illustrated in and described in reference to FIG. 3 (which may in turn invoke dead link detector 104 to perform the process of FIG. 2), to determine whether the page is alive and requires a prerequisite page to retrieve the page from the host.

If the page is determined a dead page, then at block 414 the page (or the URL representing the page in the IIS 110 of FIG. 1) is marked as dead. Further, the continuous dead link count (CDC) is incremented by one, and the continuous alive link count (CAC) and the continuous prerequisite URL require link count (CPC) are reset to zero because the instance of a dead link broke any continuity of alive links that do not require a prerequisite page and alive links that require a prerequisite page. These variables are reset because the optimization portion of the process operates on assumptions based on the continuous counts of page types, which is described in greater detail hereafter. Thus, once the continuity of a page type is broken, the assumption is no longer considered valid, and the variables are reset accordingly in order to begin again the count of continuous page types. After block 414, process control returns to block 402 to retrieve the next page from the site host.

Similarly, if the page is determined an alive page (at block 412), then at block 416 the page (or the URL representing the page in the IIS 110 of FIG. 1) is marked as alive. Further, the continuous alive link count (CAC) is incremented by one, and the continuous dead link count (CDC) and the continuous prerequisite URL require link count (CPC) are reset to zero because the instance of an alive link that does not require a prerequisite page broke any continuity of dead links and alive links that require a prerequisite page. After block 416, process control returns to block 402 to retrieve the next page from the site host.

Similarly, if the page is determined an alive page that requires a prerequisite page (at block 412), then at block 418 the following logic is executed:
    IF (PREREQ URL=LPU)
    THEN {CPC=CPC+1}
    ELSE {CPC=1;
    LPU=PREREQ URL}
    CDC=CAC=0

To describe the foregoing logic, if the prerequisite page for the page currently under consideration is the same page as the last known prerequisite page (LPU), then the continuous prerequisite URL require link count (CPC) is incremented by one. Otherwise, if the prerequisite page for the page currently under consideration is not the same page as the last known prerequisite page (LPU), the continuity is broken and, therefore, CPC is set to one because the prerequisite page for the page currently under consideration is the first of the continuous prerequisite page count. Additionally, if the prerequisite page for the page currently under consideration is not the same page as the last known prerequisite page (LPU), then LPU is set to the prerequisite page for the page currently under consideration. Finally, regardless of whether or not the prerequisite page for the page currently under consideration is the same page as the last known prerequisite page (LPU), continuous dead link count (CDC) and the continuous alive link count (CAC) are reset to zero because the instance of an alive link requiring a prerequisite page broke any continuity of dead links and alive links that do not require a prerequisite page. After block 418, process control returns to block 402 to retrieve the next page from the site host.

As mentioned, the optimization portion (blocks 406-411) of the process is performed in response to HPC not being a multiple of OCI, at block 404. At decision block 406, it is determined whether or not the count of continuous dead links (CDC) is greater than the optimization check interval (OCI). If CDC is greater than OCI, then, at block 407, the link is marked as dead. For example, with OCI equal to ten, if eleven consecutive dead links are encountered (i.e., eleven consecutive page links considered were determined to be dead links), then the next several links are assumed to be dead, without actually retrieving the corresponding pages from the host. That is, once CDC exceeds OCI and until HPC is a multiple of OCI at block 404, the next links considered are simply marked as dead without retrieving the corresponding pages from the host. If and when HPC is a multiple of OCI, then the optimization portion of the process is bypassed and control is passed to block 412, as previously described herein. From block 407, control passes back to block 402 to retrieve the next page from the host.

If CDC is not greater than OCI at block 406, then control passes to decision block 408, at which it is determined whether or not the count of continuous alive links (CAC) is greater than the optimization check interval (OCI). If CAC is greater than OCI at block 408, then, at block 409, the link is marked as alive. For example, with OCI equal to ten, if eleven consecutive alive links are encountered (i.e., eleven consecutive page links considered were determined to be alive links), then the next several links are assumed to be alive, without actually retrieving the corresponding pages from the host.

That is, once CAC exceeds OCI and until HPC is a multiple of OCI at block 404, the next links considered are simply marked as alive without retrieving the corresponding pages from the host. If and when HPC is a multiple of OCI, then the optimization portion of the process is bypassed and control is passed to block 412, as previously described herein. From block 409, control passes back to block 402 to retrieve the next page from the host.

Similarly, if CAC is not greater than OCI at block 408, then control passes to decision block 410, at which it is determined whether or not the count of continuous alive link that require a prerequisite page (CPC) is greater than the optimization check interval (OCI). If CPC is greater than OCI at block 410, then, at block 411, the link is marked as alive and the prerequisite page for the page currently under consideration is set to the last known prerequisite URL (LPU). For example, with OCI equal to ten, if eleven consecutive alive links that require the same prerequisite page are encountered, then the next several links are assumed to be alive with a prerequisite URL being the LPU, without actually retrieving the corresponding pages from the host. That is, once CPC exceeds OCI and until HPC is a multiple of OCI at block 404, the next links considered are simply marked as alive with corresponding prerequisite pages set to the last known URL (i.e., the prerequisite URL for at least the preceding nine pages) without retrieving the corresponding pages from the host. If and when HPC is a multiple of OCI, then the optimization portion of the process is bypassed and control is passed to block 412, as previously described herein. From block 411, control passes back to block 402 to retrieve the next page from the host.

A basic premise of the process illustrated in FIG. 4 is that if a certain consecutive number of links are of the same type (i.e., dead, alive, or alive requiring prerequisite page), then assume that the next certain number of links are of the same type and, therefore, do not retrieve the pages corresponding to these next certain number of links. Thus, overall link detection/classification processing time is shortened and requests to the host are avoided. However, occasionally the assumptions should be validated. Hence, after every certain number of pages are considered, then the next page is retrieved from the host, analyzed to detect its link type, and one continuous type count is incremented and the other type counts are reset.

If the determined link type is the same as per the previous assumption, then the process retrieves the next page from the host, returns to the optimization portion and continues to assume the next certain number of links are of the same type without retrieving the corresponding pages from the host. If the determined type is not the same as per the previous assumption, then the type counts are reset and the next page is retrieved from the host for processing. Effectively, the optimization portion of the process is reset if the determined type is not the same as per the previous assumption.

If the continuous link type counts (CDC, CAC, CPC) never exceed the OCI threshold, then the host site's content is dynamic in that it has a tendency to change over the time between the previous crawl and the link checking process and, effectively, almost every page is checked. Hence, the pages should be re-crawled in order to keep the crawl, and the corresponding indexable data 118 (FIG. 1) and search index 126 (FIG. 1), fresh.

Hardware Overview

Figure 5:
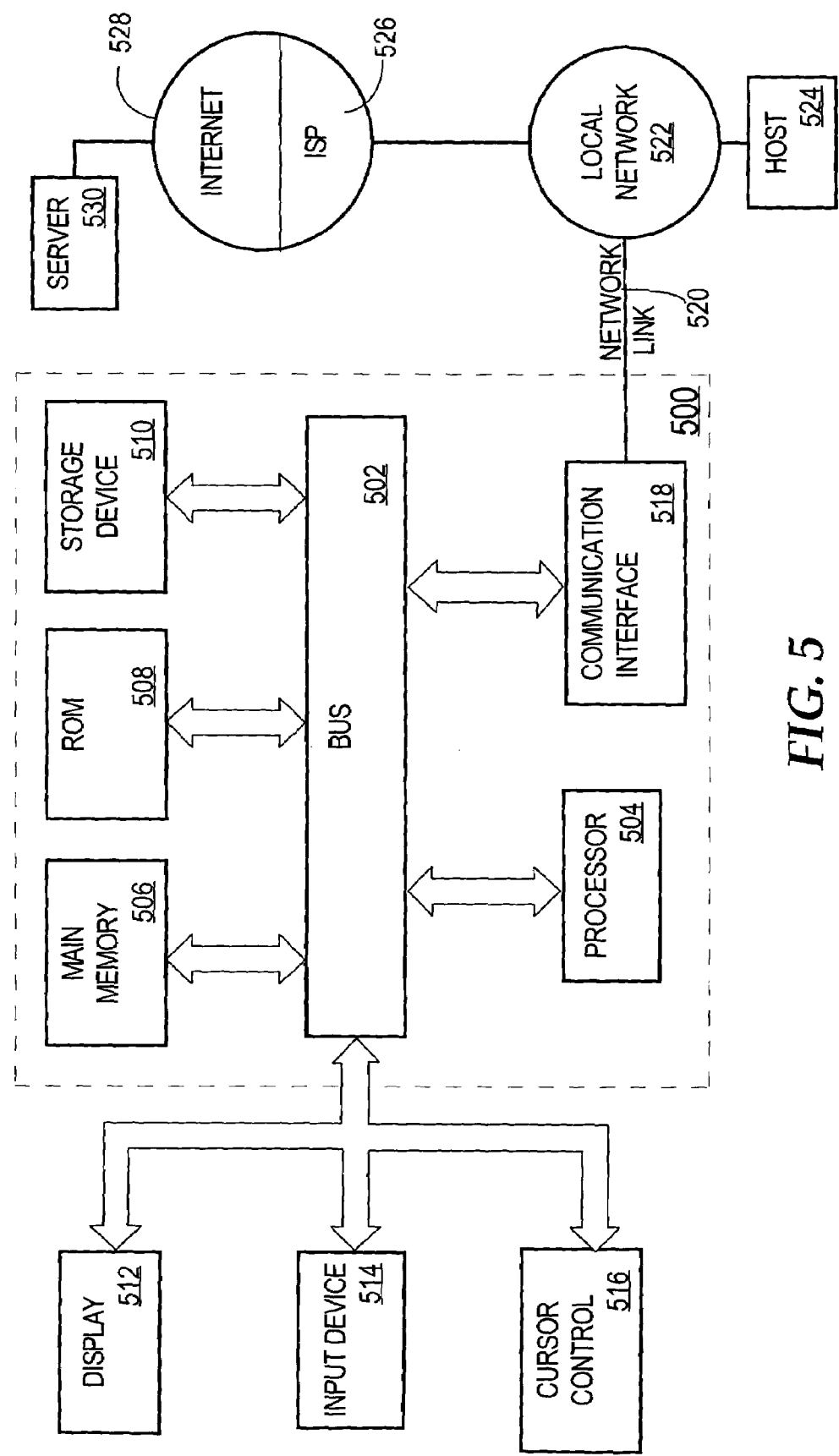
FIG. 5 is a block diagram that illustrates a computer system 500 upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504.

Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Alternative embodiments of the invention are described throughout the foregoing specification, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method comprising:
   retrieving, from a site host, pages associated with the site, wherein the pages contain content;
   determining how dynamic the content of the site is, based on the degree to which the content of the retrieved pages changed since a previous crawl of the site;
   if the content of the site is determined dynamic, in relation to a corresponding threshold, then continuing retrieving, from the site host, pages associated with the site; and
   if the content of the site is determined not dynamic, in relation to the corresponding threshold, then not retrieving, from the site host, a subset of pages associated with the domain;
   wherein determining how dynamic the content of the site is comprises maintaining a count of the number of continuous pages for which a same prerequisite page must be retrieved to retrieve the continuous pages;
   wherein retrieving a first page of the continuous pages without first retrieving the same prerequisite page causes a link to the first page to appear as a dead link but retrieving the first page after retrieving the same prerequisite page causes the link to the first page to appear as an alive link;
   wherein retrieving the same prerequisite page causes information required for retrieving the first page to be retrieved from the site host;
   wherein the method is performed by one or more computing devices comprising one or more processors.

2. The method of claim 1,
   wherein determining how dynamic the content of the site is comprises maintaining a count of the number of continuous dead links encountered; and
   wherein not retrieving a subset of pages comprises indicating that each link corresponding to a page from the subset of pages is a dead link, without actually retrieving the page from the site host.

3. The method of claim 1,
   wherein determining how dynamic the content of the site is comprises maintaining a count of the number of continuous alive links encountered; and
   wherein not retrieving a subset of pages comprises indicating that each link corresponding to a page from the subset of pages is an alive link, without actually retrieving the page from the site host.

4. The method of claim 1,
   wherein not retrieving a subset of pages comprises indicating that each page from the subset of pages requires the same prerequisite page to be retrieved to retrieve the page, without actually retrieving the page from the site host.

5. The method of claim 1, further comprising:
determining whether a link to a page is dead or alive by
retrieving, from crawler storage, indexable words that were found in the page corresponding to the link during a previous crawl of the page;
retrieving the current version of the page;
determining how many of the indexable words match words in the current version of the page; and
if a ratio of matched words in the current version of the page over the number of indexable words exceeds a certain value, then mark the link corresponding to the page as an alive link, else mark the link corresponding to the page as a dead link.

6. The method of claim 5, wherein retrieving the current version of the page includes:
retrieving, from crawler storage, information that indicates whether retrieving the page requires use of an HTTP POST method;
if the HTTP POST method is required, then
retrieving, from crawler storage, post data corresponding to the page which was used to retrieve the page during a previous crawl; and
retrieving the page by transmitting the post data via an HTTP POST request.

7. The method of claim 1, further comprising:
in response to determining that a link to a page is dead,
retrieving, from crawler storage, information that indicates whether or not retrieving the page requires setting request information by retrieving a prerequisite page, wherein the information identifies one or more ancestor pages that were retrieved prior to retrieving the page during a previous crawl and the order in which the one or more ancestor pages were retrieved;
if the page requires setting request information by retrieving a prerequisite page, then
(a) retrieving a first ancestor page, wherein the first ancestor page is the ancestor page that was retrieved immediately prior to retrieving the page during the previous crawl;
(b) after performing step (a), retrieving the page;
(c) determining whether the page is dead or alive;
(d) if the page is alive, then determining that the first ancestor page is a prerequisite page for the page; and
(e) if the page is dead, then retrieving a second ancestor page, wherein the second ancestor page is the ancestor page that was retrieved immediately prior to retrieving the first ancestor page during the previous crawl, and repeating steps (b), (c) and (d) for the second ancestor page and, if necessary, repeating step (e) for the next ancestor page in the order.

8. The method of claim 7, further comprising:
storing, in a search system, an identifier of the prerequisite page for the page; and
in response to a user request for the page, wherein the request is made by using a link to the page from search results from the search system,
directing a request to the prerequisite page based on the stored identifier of the prerequisite page; and
then directing a request to the page.

9. The method of claim 7, further comprising:
determining whether a link to a page is dead or alive by
retrieving, from crawler storage, indexable words that were found in the page corresponding to the link during a previous crawl of the page;
retrieving the current version of the page;
determining how many of the indexable words match words in the current version of the page; and
if a ratio of matched words in the current version of the page over the number of indexable words exceeds a certain value, then mark the link corresponding to the page as an alive link, else mark the link corresponding to the page as a dead link.

10. The method of claim 1, wherein the step of retrieving pages comprises concurrently retrieving pages associated with multiple site domains, and wherein retrieving pages for each site domain is performed by a single respective processing thread that does not retrieve pages for any other site domain.

11. A volatile or non-volatile machine-readable medium storing one or more sequences of instructions which, when executed by one or more processors, causes the one or more processors to perform:
retrieving, from a site host, pages associated with the site, wherein the pages contain content;
determining how dynamic the content of the site is, based on the degree to which the content of the retrieved pages changed since a previous crawl of the site;
if the content of the site is determined dynamic, in relation to a corresponding threshold, then continuing retrieving, from the site host, pages associated with the site; and
if the content of the site is determined not dynamic, in relation to the corresponding threshold, then not retrieving, from the site host, a subset of pages associated with the domain;
wherein determining how dynamic the content of the site is comprises maintaining a count of the number of continuous pages for which a same particular prerequisite page must be retrieved to retrieve the continuous pages;
wherein retrieving a first page of the continuous pages without first retrieving the same prerequisite page causes a link to the first page to appear as a dead link but retrieving the first page after retrieving the same prerequisite page causes the link to the first page to appear as an alive link;
wherein retrieving the same prerequisite page causes information required for retrieving the first page to be retrieved from the site host;
wherein the method is performed by one or more computing devices comprising one or more processors.

12. A volatile or non-volatile machine-readable medium storing one or more sequences of instructions of claim 11 which, when executed by one or more processors, causes the one or more processors to further perform:
wherein determining how dynamic the content of the site is comprises maintaining a count of the number of continuous dead links encountered; and
wherein not retrieving a subset of pages comprises indicating that each link corresponding to a page from the subset of pages is a dead link, without actually retrieving the page from the site host.

13. A volatile or non-volatile machine-readable medium storing one or more sequences of instructions of claim 11 which, when executed by one or more processors, causes the one or more processors to further perform:

wherein determining how dynamic the content of the site is comprises maintaining a count of the number of continuous alive links encountered; and wherein not retrieving a subset of pages comprises indicating that each link corresponding to a page from the subset of pages is an alive link, without actually retrieving the page from the site host.

14. A volatile or non-volatile machine-readable medium storing one or more sequences of instructions of claim 11 which, when executed by one or more processors, causes the one or more processors to further perform:

wherein not retrieving a subset of pages comprises indicating that each page from the subset of pages requires the same prerequisite page to be retrieved to retrieve the page, without actually retrieving the page from the site host.

15. A volatile or non-volatile machine-readable medium storing one or more sequences of instructions of claim 11 which, when executed by one or more processors, causes the one or more processors to further perform:

determining whether a link to a page is dead or alive by retrieving, from crawler storage, indexable words that were found in the page corresponding to the link during a previous crawl of the page;

retrieving the current version of the page;

determining how many of the indexable words match words in the current version of the page; and if a ratio of matched words in the current version of the page over the number of indexable words exceeds a certain value, then mark the link corresponding to the page as an alive link, else mark the link corresponding to the page as a dead link.

16. A volatile or non-volatile machine-readable medium storing one or more sequences of instructions of claim 15 which, when executed by one or more processors, causes the one or more processors to further perform:

retrieving, from crawler storage, information that indicates whether retrieving the page requires use of an HTTP POST method;

if the HTTP POST method is required, then retrieving, from crawler storage, post data corresponding to the page which was used to retrieve the page during a previous crawl; and retrieving the page by transmitting the post data via an HTTP POST request.

17. A volatile or non-volatile machine-readable medium storing one or more sequences of instructions of claim 11 which, when executed by one or more processors, causes the one or more processors to further perform:

in response to determining that a link to a page is dead, retrieving, from crawler storage, information that indicates whether or not retrieving the page requires setting request information by retrieving a prerequisite page, wherein the information identifies one or more ancestor pages that were retrieved prior to retrieving the page during a previous crawl and the order in which the one or more ancestor pages were retrieved;

if the page requires setting request information by retrieving a prerequisite page, then (a) retrieving a first ancestor page, wherein the first ancestor page is the ancestor page that was retrieved immediately prior to retrieving the page during the previous crawl;

(b) after performing step (a), retrieving the page;

(c) determining whether the page is dead or alive;

(d) if the page is alive, then determining that the first ancestor page is a prerequisite page for the page; and (e) if the page is dead, then retrieving a second ancestor page, wherein the second ancestor page is the ancestor page that was retrieved immediately prior to retrieving the first ancestor page during the previous crawl, and repeating steps (b), (c) and (d) for the second ancestor page and, if necessary, repeating step (e) for the next ancestor page in the order.

18. A volatile or non-volatile machine-readable medium storing one or more sequences of instructions of claim 17 which, when executed by one or more processors, causes the one or more processors to further perform:

storing, in a search system, an identifier of the prerequisite page for the page; and in response to a user request for the page, wherein the request is made by using a link to the page from search results from the search system, directing a request to the prerequisite page based on the stored identifier of the prerequisite page; and then directing a request to the page.

19. A volatile or non-volatile machine-readable medium storing one or more sequences of instructions of claim 17 which, when executed by one or more processors, causes the one or more processors to further perform:

determining whether a link to a page is dead or alive by retrieving, from crawler storage, indexable words that were found in the page corresponding to the link during a previous crawl of the page;

retrieving the current version of the page;

determining how many of the indexable words match words in the current version of the page; and if a ratio of matched words in the current version of the page over the number of indexable words exceeds a certain value, then mark the link corresponding to the page as an alive link, else mark the link corresponding to the page as a dead link.

20. A computer-implemented method for determining a prerequisite page for a page while checking, in an automated manner, page links associated with a site domain that was previously crawled, the method comprising:

retrieving, from crawler storage, information that indicates whether or not retrieving the page requires setting request information by retrieving a prerequisite page, wherein the information identifies one or more ancestor pages that were retrieved prior to retrieving the page during a previous crawl and the order in which the one or more ancestor pages were retrieved, and wherein retrieving the prerequisite page causes information required for retrieving the page to be retrieved;

if the page requires setting request information by retrieving a prerequisite page, then (a) retrieving a first ancestor page, wherein the first ancestor page is the ancestor page that was retrieved immediately prior to retrieving the page during the previous crawl;

(b) after performing step (a), retrieving the page;

(c) determining whether the page is dead or alive;

(d) if the page is alive, then determining that the first ancestor page is a prerequisite page for the page; and (e) if the page is dead, then retrieving a second ancestor page, wherein the second ancestor page is the ancestor page that was retrieved immediately prior to retrieving the first ancestor page during the previous crawl, and repeating steps (b), (c) and (d) for the second ancestor page and, if necessary, repeating step (e) for the next ancestor page in the order;

wherein the method is performed by one or more computing devices comprising one or more processors.

21. The method of claim 20, further comprising:
storing, in a search system, an identifier of the prerequisite page for the page; and
in response to a user request for the page, wherein the request is made by using a link to the page from search results from the search system,
   directing a request to the prerequisite page based on the stored identifier of the prerequisite page.

22. The method of claim 21, further comprising:
after directing the request to the prerequisite page, directing a request to the page.

23. A volatile or non-volatile machine-readable medium storing one or more sequences of instructions which, when executed by one or more processors, causes the one or more processors to perform the method recited in claim 22.

24. A volatile or non-volatile machine-readable medium storing one or more sequences of instructions which, when executed by one or more processors, causes the one or more processors to perform the method recited in claim 21.

25. A volatile or non-volatile machine-readable medium storing one or more sequences of instructions which, when executed by one or more processors, causes the one or more processors to perform the method recited in claim 20.

26. A computer-implemented method comprising:
retrieving, from a site host, pages associated with the site, wherein the pages contain content;
determining how dynamic the content of the site is, based on a count of the number of continuous pages for which a same prerequisite page must be retrieved to retrieve the continuous pages, wherein the count is reset upon retrieval of a different prerequisite page;
if the content of the site is determined dynamic, in relation to a corresponding threshold, then continuing retrieving, from the site host, pages associated with the site; and
if the content of the site is determined not dynamic, in relation to the corresponding threshold, then not retrieving, from the site host, a subset of pages associated with the domain;
wherein retrieving a first page of the continuous pages without first retrieving the same prerequisite page causes a link to the first page to appear as a dead link but retrieving the first page after retrieving the same prerequisite page causes the link to the first page to appear as an alive link;
wherein retrieving the same prerequisite page causes information required for retrieving the first page to be retrieved from the site host;
wherein the method is performed by one or more computing devices comprising one or more processors.

* * * * *